United States Patent Office 3,538,156
Patented Nov. 3, 1970

3,538,156
CINNAMAMIDES
Herbert Schwartz, 127 N. State St., Vineland, N.J. 08360, and Joseph B. Skaptason, 12700 Prospect Ave., Kansas City, Mo. 64146
No Drawing. Filed July 24, 1967, Ser. No. 655,330
Int. Cl. C07c *103/30*
U.S. Cl. 260—558          5 Claims

ABSTRACT OF THE DISCLOSURE

Novel cinnamamides of the formula

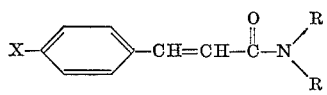

wherein R is selected from the group consisting of propyl and butyl and X is a halogen and their herbicidal use.

PRIOR ART

Herbicides are becoming increasingly more important in agriculture throughout the world due to the necessity of obtaining optimum crop yields to feed an increasing population. One of the most basic crops in the world is rice which is grown and consumed throughout the world in large quantities. World agriculture has begun to use herbicides on rice but available herbicides for rice suffer various disadvantages. Propanil (3',4'-dichloropropionanilide) is the established herbicides in all rice growing areas of the United States but has serious deficiencies because it is effective only when applied post-emergence and timing of application is critical, it will not perform properly at low temperatures and has no residual herbicidal effect, has poor control of algae in flooded fields and requires close supervision of water management.

OBJECTS OF THE INVENTION

It is an object of the invention to provide novel cinnamamides of Formula I.

It is another object of the invention to provide novel pre- and post-emergence herbicidal compositions.

It is a further object of the invention to provide novel methods of killing weeds in useful crops.

These and other objects and advantages of the invention will become obvious from the following detailed description.

THE INVENTION

The novel cinnamamides of the invention are cinnamamides of the formula

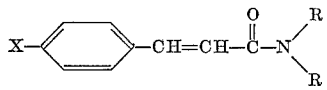

wherein R is selected from the group consisting of propyl and butyl and X is a halogen. The said compounds possess excellent pre-and post-emergence herbicidal activity, particularly on grassy weeds such as crabgrass (*Digitaria sanguinalis*), foxtail (*Setaria viridis*) and Johnson grass and some broad leafed weeds such as pigweed (*Amaranthus retroflexus*) and smartweed (*Polygonum spp.*) while being nontoxic to useful crops such as peanuts, strawberries, peas, soybeans, cotton and rice.

The said compounds are particularly useful as herbicides for rice for which there has not yet been discovered a satisfactory herbicide. They are safe for use in rice fields at high dosages and are extremely effective against crabgrass and barnyard grass, which occur in rice fields. Moreover, the said compounds can be applied post-emergence or pre-emergence. N,N-dipropyl and N,N-butyl-4-chlorocinnamamides are the preferred compounds due to their higher herbicidal activity.

The herbicidal compositions of the invention may be in the form of dusting preparations or solutions, emulsions, dispersions, concentrates, wettable powders, etc. The usual useful dosage is 0.5 to 20, preferably 1 to 5, pounds per acre depending upon the method of application.

In order to prepare a solution suitable for direct spraying there may be used, for example, a mineral oil fraction of high or medium boiling range, such as diesel oil or kerosene, or coal tar oils, or vegetable or animal oils and also hydrocarbons such as alkylated naphthalenes, or tetrahydronaphthalene, if desired, with the use of xylene mixtures, cyclohexanols, ketones, or chlorinated hydrocarbons, such as tetrachloroethane, trichloroethylene, or tri- or tetrachlorobenzenes.

Aqueous preparations suitable for application can be prepared by the addition of water to emulsion concentrates, pastes or wettable powders. As emulsifying or dispersing agents there may be used non-ionic products, for example, condensation products of ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soybean fatty acid with 30 molecular proportions of ethylene oxide or of commercial oleylamine with 15 molecular proportions of ethylene oxide or of dodecylmercaptan with 12 molecular proportions of ethylene oxide. Among anion active emulsifying agents there may be mentioned the sodium salt of dodecyl alcohol sulfuric acid ester, the sodium of dodecyl-benzene sulfonic acid, the potassium or triethanolamine salt of oleic acid or abietic acid or of a mixture of these acids, or the sodium salt of petroleum-sulfonic acid. As cation-active dispersing agents there may be used, quaternary ammonium compounds, such as cetyl-pyridinium bromide or di-(hydroxyethyl)-benzyl-dodecyl-ammonium chloride.

For making dusting or scattering preparations, there may be used as solid carriers talcum, kaolin, bentonite, calcium carbonate or calcium phosphate or carbon, cork meal or wood meal or other materials of vegetable origin. The various preparations can be rendered more suitable for the various ways in which they are to be used by the known addition of substances which improve the dispersion, adhesiveness, resistance to rain or penetration capacity of the compositions. As such substances, there may be mentioned fatty acids, resins, glue, casein, or, for example, alginates or the like.

In the following examples there are described several preferred embodiments to illustrate the invention. However, it should be understood that the invention is not intended to be limited to the specific embodiments.

EXAMPLE I

Preparation of N,N-dipropyl-4-chlorocinnamamide

A solution of 42 gm. of 4-chlorobenzaldehyde and 60 gm. of malonic acid in 120 cc. of pyridine and 3 cc. of piperidine was held at room temperature for 5 days under anhydrous conditions and then was refluxed for 10 minutes. After the solution had cooled to room temperature, it was poured into a mixture of 175 cc. of hydrochloric acid and 300 gm. of ice. The solid precipitate which formed was filtered off, washed with water and air dried to obtain 60 gm. of 4-chlorocinnamic acid.

9.1 gm. of 4-chlorocinnamic acid were suspended in chloroform and 7 gm. of thionyl chloride were added thereto. The reaction mixture was refluxed for half an hour during which the acid chloride went into solution.

10 cc. of pyridine and 10 gm. of dipropylamine were added to the resulting solution with cooling and the mixture was allowed to stand for half an hour after which it was refluxed for 1½ hours. The solution was then cooled, filtered to remove hydrochloride and washed with water until the wash water was neutral. After drying the solution over sodium sulfate, the solvent was distilled off to obtain 13.3 gm. of a solid residue which was recrystallized from hexane to obtain 10 gm. (75% yield) of N,N-dipropyl-4-chlorocinnamamide having a melting point of 40–42° C.

*Analysis.*—Calculated for $C_{15}H_{20}ClNO$, molecular weight=265.795 (percent): N, 5.27. Found (percent): N, 5.36.

EXAMPLE II

Preparation of N,N-dibutyl-4-chlorocinnamamide

Using the procedure of Example I, 10 gm. of dibutylamine were reacted with 4-chlorocinnamic acid chloride to obtain 11 gm. (75% yield) of N,N-dibutyl-4-chlorocinnamamide having a melting point of 34–35° C.

*Analysis.*—Calculated for $C_{17}H_{24}ClNO$, molecular weight=293.849 (percent): N, 4.76. Found (percent): N, 4.98.

EXAMPLE III

Preparation of N,N-dipropyl-4-fluorocinnamamide

Using the procedure of Example I, dipropylamine was reacted with 4-fluorocinnamic acid chloride to obtain N,N-dipropyl-4-fluorocinnamamide in the form of a viscous oil.

*Analysis.*—Calculated for $C_{15}H_{20}FNO$, molecular weight=249.338 (percent): N, 5.62. Found (percent): N, 5.57.

EXAMPLE IV

Preparation of N,N-dibutyl-4-fluorocinnamamide

Using the procedure of Example I, dibutylamine was reacted with 4-fluorocinnamic acid chloride to obtain N,N-dibutyl-4-fluorocinnamamide in the form of a viscous oil.

*Analysis.*—Calculated for $C_{17}H_{24}FNO$, molecular weight=277.392 (percent): N, 5.05. Found (percent): N, 4.96.

EXAMPLE V

Preparation of N,N-dipropyl-4-bromocinnamamide

Using the procedure of Example I, dipropylamine was reacted with 4-bromocinnamic acid chloride to form N,N-dipropyl-4-bromocinnamamide having a melting point of 48–50° C.

*Analysis.*—Calculated for $C_{15}H_{20}BrNO$, molecular weight=310.254 (percent): N, 4.51. Found (percent): N, 4.68.

Using the same procedure, N,N-dibutyl-4-bromocinnamamide, N,N-dipropyl-4-iodocinnamamide and N,N-dibutyl-4-iodocinnamamide could also be prepared.

EXAMPLE VI

Selective pre-emergence activity 12 x 12 x 3 inch metal flats were planted with seeds of the desired crops and weeds at a soil depth of approximately one-half inch. Care was employed to use a consistent amount of soil in each flat so as to assure uniform seed germination and subsequent seedling development. Also, to reduce random experimental error, a templet was used to make the seed planting furrows and a uniform number or amount of seeds were placed in each flat. Each experimental chemical was prepared for testing by placing an amount of technical material in a volume of acetone/water to equal the desired application rate in a spray volume equivalent to 40 gallon/acre. Chemical applications were made with a fan-type spray directly to the soil surface. After treatment, all flats were placed in the greenhouse and maintained under ambient conditions.

At the end of twenty-seven days, a phytotoxicity evaluation of each herbicide under test was made. This evaluation included an assessment of plant species killed and an estimation of the vigor and growth of remaining plants that were not killed. The later data are of importance in herbicide screening and evaluation in that satisfactory herbicides need not always kill weeds outright but can reduce their growth and vigor to such an extent that competition with desired crop plant species does not occur. The ratings for vigor are explained beneath Table I, and the herbicidal results are recorded in Table I.

TABLE I

| Chemical | Dosage rate, lbs./acre broad | Crabgrass V | Crabgrass Percent K | Barnyard grass V | Barnyard grass Percent K | Rice V | Rice Percent K |
|---|---|---|---|---|---|---|---|
| N,N-dipropyl-4-chlorocinnamamide | 0.75 | 0 | 100 | 4 | 10 | 5 | 0 |
|  | 1.5 | 0 | 100 | 3 | 40 | 5 | 0 |
|  | 3.0 | 0 | 100 | 0 | 100 | 5 | 0 |
| N,N-dipropyl-4-fluorocinnamamide | 0.75 | 5 | 0 | 5 | 0 | 5 | 0 |
|  | 1.5 | 4 | 30 | 5 | 0 | 5 | 0 |
|  | 3.0 | 0 | 100 | 4 | 25 | 5 | 0 |
| Ordram (S-ethyl-hexahydro-1H-azepine-1-carbothioate) | 0.75 | 5 | 0 | 5 | 0 | 5 | 0 |
|  | 1.5 | 5 | 0 | 4 | 30 | 5 | 0 |
|  | 3.0 | 5 | 0 | 2 | 80 | 4 | 0 |

NOTE.—V Rating System: 5=normal; 4=slight injury; 3=moderate injury; 2=moderate-severe injury; 1 = severe, plants will not recover; 0=plants killed.
Percent K: kill based on percentage.

As can be seen from Table I, the compounds of the invention effectively control grass weeds in rice while Ordram, which is a herbicide undergoing commercial development, does not effectively control both grasses under these test conditions.

EXAMPLE VII

Selective pre-emergence activity

Flats (11 x 13 inches) were planted with the desired crops to a depth of approximately one-half inch and care was employed in using a consistent amount of soil in the bottom of the flats, in the use of a templet in the marking of the seed rows, in the amount of seeds used, and pariculary in the amount of soil placed on top of the seeds in the interest of uniformity from day to day and test to test. The chemicals were prepared as 25% wettable powders with 75% of a pre-mix consisting of 92% by weight of Hi Sil 232 (a hydrated silica pigment), 4% by weight of Maraspense-N (a lignosulfonate) and 4% by weight of Pluronic L 61 (an ethyleneoxide-propyleneoxide condensate). The concentrates were diluted with water to the desired dosage and 250 ml. of such a suspension were uniformly distributed over each flat. The flats were immediately transferred to the greenhouse and were covered for a period of three days so that additional watering was not required until some of the plants had begun to make their appearance above ground. When it was assured that all emergence had occurred, as determined by the check, emergence counts were made on all crops. At the end of 25 days, a phytotoxicity reading was made on the various crops indicating the extent of damage not only by the stand of the crop, but also the extent of damage of the emerged seedlings. Phytotoxicity data were recorded on a scale of 0 to 10 in which 0 indicates no injury to the other extreme where 10 indicates that the plants were killed. The results are set forth in Table II.

Triton X-161 is a blend of anionic and non-anionic alkyl aryl polyether alcohols and organic sulfonates. Solvent F is a 50:50 by volume mixture of diethylene glycol monobutyl ether acetate and Velsicol AR 50 (methylated naphthalenes). Before application, the concentrates were diluted to the desired concentration of the compound being tested with water. The crops to be tested had been planted in flats 17 days before the tests and were well

TABLE II.—PRE-EMERGENCE HERBICIDAL TESTING

| Chemical | Dose, lbs./acre | Variety | Smart weed | Crab-grass | Onion | Pig-weed | Setaria | Johnson grass | Cotton | Soy-bean | Corn |
|---|---|---|---|---|---|---|---|---|---|---|---|
| N,N-diethyl-4-chlorocinnamamide | 2.5 | Emerg | | | 64 | 24 | 36 | 72 | 50 | 100 | 100 |
| | | P.R. | 0 | 2 | 0 | 9+ | 9 | 1 | 0 | 0 | 0 |
| | 1.25 | Emerg | | | 80 | 36 | 96 | 84 | 95 | 93 | 100 |
| | | P.R. | 0 | 0 | 0 | 4 | 3 | 0 | 0 | 0 | 0 |
| N,N-dipropyl-2-chlorocinnamamide | 5 | Emerg | | | 60 | 52 | 69 | 51 | 75 | 94 | 100 |
| | | P.R. | 8 | 0 | 0 | 6 | 5 | 4 | 0 | 0 | 0 |
| | 2.5 | Emerg | | | 40 | 44 | 71 | 84 | 90 | 100 | 100 |
| | | P.R. | 8 | 0 | 0 | 3 | 2 | 2 | 0 | 0 | 0 |
| | 1.25 | Emerg | | | 68 | 60 | 56 | 75 | 90 | 88 | 100 |
| | | P.R. | 3 | 0 | 0 | 0 | 0 | 0 | 0 | 0 | 0 |
| N,N-dipropyl-4-chlorocinnamamide | 2.5 | Emerg | | | 60 | 4 | 20 | 60 | 80 | 94 | 100 |
| | | P.R. | 8 | 10 | 10 | 10 | 10 | 9 | 0 | 0 | 0 |
| | 1.25 | Emerg | | | 60 | 8 | 20 | 64 | 70 | 88 | 100 |
| | | P.R. | 7 | 10 | 10 | 10 | 10 | 6 | 0 | 0 | 0 |

Table II demonstrates that the position of halogen on the phenyl ring and the length of N,N-dialkyl carbon chains are critical in order to obtain satisfactory herbicidal activity. N,N-dipropyl-2-chlorocinnamamide is substantially inactive even at the dosage rate of 5 pounds per acre, while N,N-diethyl-4-chlorocinnamamide is inactive at 1.25 pounds per acre and shows activity only on pigweed and foxtail at 2.5 pounds per acre. In contrast thereto, N,N-dipropyl-4-chlorocinnamamide is effective on smartweed, onion, crabgrass, Johnson grass, pigweed and foxtail while being safe for the useful crops, corn, soybean and cotton.

established seedlings. The plants were sprayed by a precision turntable technique in which 30 ml. of the spray solution was applied to each flat containing the crops (2 lbs./acre). The plants were then kept under constant daily surveillance for a period of 25 days. The final phytotoxicity data were recorded at the end of 25 days and the plants were scored for phytotoxicity ratings on a scale from 0 (no injury to plants), to 10 (all the plants were killed). The results of the tests are summarized in Table III.

TABLE III.—POST-EMERGENCE ACTIVITY

| Chemical | Cotton | Beets | Tomato | Radish | Oats | Wheat | Cucumber | Pig-Weed | Foxtail | Rice | Johnson grass | | |
|---|---|---|---|---|---|---|---|---|---|---|---|---|---|
| | | | | | | | | | | | Small | Med. | Large |
| N,N-dipropyl-4-chlorocinnamamide | 0 | 8B | 10 | 9Y | 3 | 2 | 10 | 6Y | 10 | 1 | 7 | 9 | 9.5 |
| N,N-dipropyl-4-fluorocinnamamide | 0 | 2 | 7 | 9 | 1 | 0 | 7 | 1 | 10 | 0 | 6 | 4 | 4 |
| N,N-diethyl-4-chlorocinnamamide | 3 | 4 | 10 | 4Y | 0 | 0 | 9 | 5 | 10 | 8 | 8 | 8 | 9 |
| N,N-dipropyl-4-bromocinnamamide | 0 | 10 | 5 | 9 | 3 | 5 | 6 | 5 | 2 | 1 | 0 | 5 | 8 |

NOTE.—B=blanching; Y=yellowing.

EXAMPLE VIII

Selective post-emergence herbicidal activity

To demonstrate the general herbicidal activity of the cinnamamides of the invention, some of the compounds listed in Table I were applied to a variety of different plants according to the following procedure.

The compounds were prepared as 10% emulsion concentrates in the following solvent system:

Formula F:
  Compound—10% by weight
  Triton X-161—10% by weight
  Solvent F—80% by volume Table III shows that the compounds of the invention are good grass herbicides when applied post-emergence for cotton and rice crops since there is no injury thereto while N,N-diethyl-4-chlorocinnamamide is injurious to rice and cotton when applied post-emergence.

EXAMPLE IX

Using the procedure of Example VII, dosage series on the pre-emergence herbicidal activity of N,N-dipropyl-4-chlorocinnamamide and N,N-dipropyl-4-bromocinnamamide were conducted on a variety of crops and the results are shown in Table IV. The data shows that the two compounds have substantially the same degree of herbicidal selectivity when used pre-emergence in this test with possibly the chloro compound being slightly more effective.

TABLE IV

| Chemical | Dose, lbs./acre | Variety | Pigweed | Setaria | Crab-grass | Johnson grass | Soybean | Cotton |
|---|---|---|---|---|---|---|---|---|
| N,N-dipropyl-4-chlorocinnamamide | | Percent germ | 0 | 0 | 0 | 0 | 70 | 70 |
| | 10 | P.R. | 10 | 10 | 10 | 10 | 4 | 1 |
| | | Percent germ | 5 | 5 | 30 | 30 | 85 | 90 |
| | 5 | P.R. | 10 | 9.5 | 8 | 8 | 1 | 0 |
| | | Percent germ | 0 | 5 | 70 | 60 | 70 | 80 |
| | 2.5 | P.R. | 10 | 9 | 7 | 5 | 1 | 0 |
| N,N-dipropyl-4-bromocinnamamide | | Percent germ | 0 | 0 | 20 | 10 | 60 | 90 |
| | 10 | P.R. | 10 | 10 | 7 | 9 | 2 | 0 |
| | | Percent germ | 0 | 0 | 40 | 50 | 70 | 90 |
| | 5 | P.R. | 10 | 10 | 5 | 5 | 0 | 0 |
| | | Percent germ | 3 | 2 | 10 | 20 | 75 | 90 |
| | 2.5 | P.R. | 10 | 10 | 6 | 5 | 0 | 0 |
| Check | | Percent germ | 75 | 75 | 75 | 70 | 70 | 90 |
| | | P.R. | 0 | 0 | 0 | 0 | 2 | 0 |

Various modifications of the compositions and method of the invention may be made without departing from the spirit or scope thereof.

1. A compound of the formula

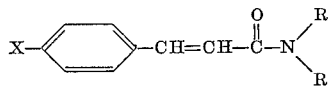

wherein X is a halogen selected from the group consisting of fluorine and chlorine and R is selected from the group consisting of propyl and butyl.

2. A compound of claim 1 wherein the compound is N,N-dipropyl-4-chlorocinnamamide.

3. A compound of claim 1 wherein the compound is N,N-dibutyl-4-chlorocinnamamide.

4. A compound of claim 1 wherein the compound is N,N-dipropyl-4-fluorocinnamamide.

5. A compound of claim 1 wherein the compound is N,N-dibutyl-4-fluorocinnamamide.

References Cited

McCabe et al., J. Org. Chem., vol. 19, pp. 493–98 (1954).

Papa et al., J. Am. Chem. Soc., vol. 72, pp. 3885–86 (1950).

HENRY R. JILES, Primary Examiner

H. I. MOATZ, Assistant Examiner

U.S. Cl. X.R.

71—118